June 5, 1951 P. KOLLSMAN 2,556,038
APPARATUS FOR CARBONATING BEVERAGES
Filed July 10, 1946
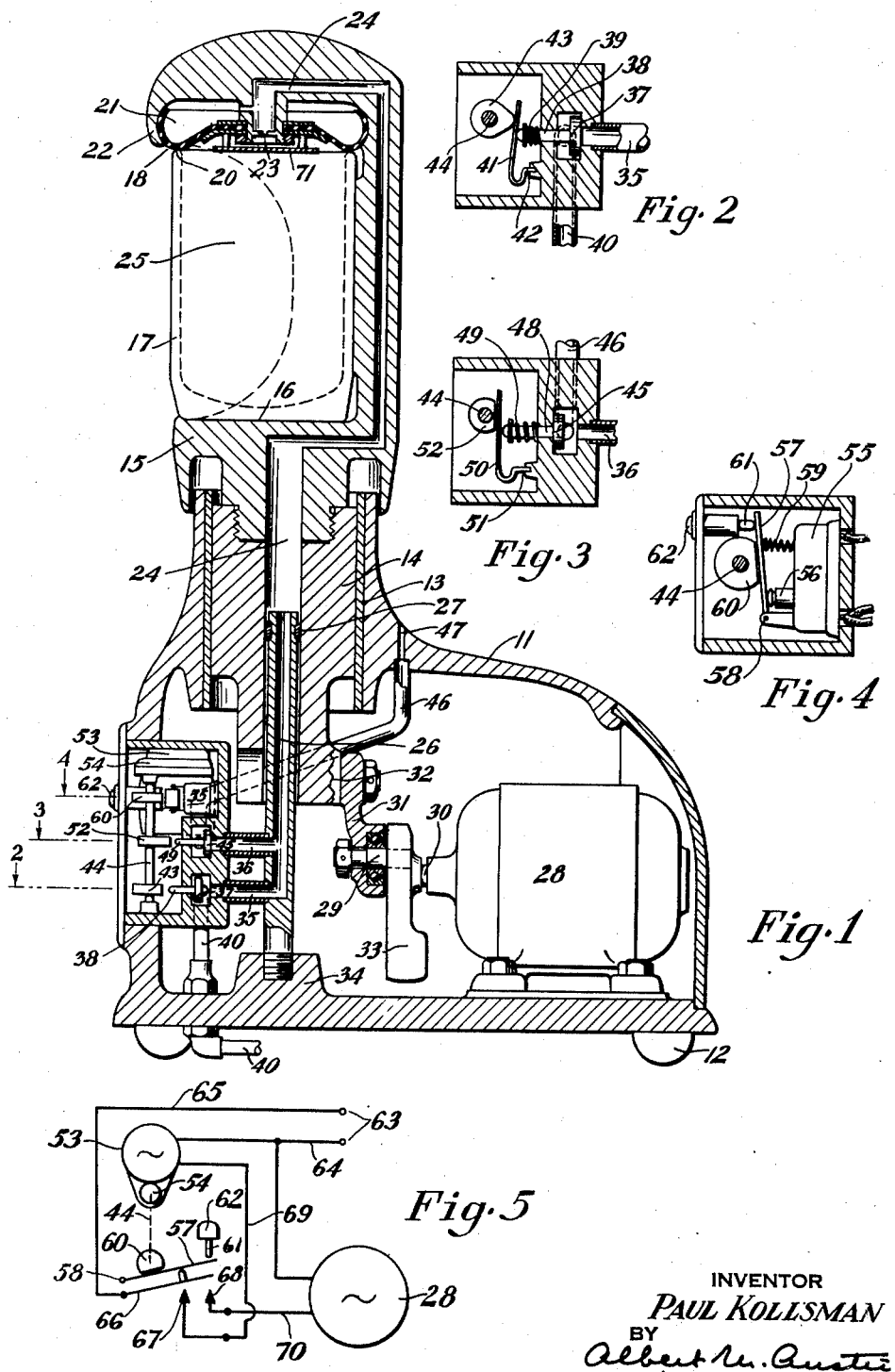
INVENTOR
PAUL KOLLSMAN
BY
Albert M. Austin
his ATTORNEY Patented June 5, 1951

2,556,038

UNITED STATES PATENT OFFICE 2,556,038

APPARATUS FOR CARBONATING BEVERAGES

Paul Kollsman, New York, N. Y.

Application July 10, 1946, Serial No. 682,663

7 Claims. (Cl. 261—42)

This invention provides an automatic apparatus for carbonating beverages.

At present it is common practice to carbonate beverages at the plant of the producer and to ship the carbonated beverage in appropriate pressure resistant bottles, tanks or other containers to the place of consumption, for example, a soda fountain. This practice entails certain disadvantages. The shipping and storing of bottles or other containers of carbonated beverage involves handling of much dead weight and requires a considerable amount of space resulting in substantial expense. The described practice has the further disadvantage that the demand both as to quantity and kind of beverage must be anticipated and that unexpected demands cannot be supplied.

Other common practice is to mix a flavoring liquid at the soda fountain with water carbonated on the premises. This practice calls for an installation of substantial size including compressers, tanks and piping which constitute a considerable investment. However, the main disadvantage of the last mentioned practice is that the dispensing of carbonated water into a cup, the addition of a flavoring substance and the subsequent stirring of the beverage in order to mix it results in a loss of a very substantial portion of the carbon dioxide. A beverage produced in this manner has therefore relatively little effervescence since most of the carbon dioxide is driven out before the beverage is actually consumed. As a further disadvantage may be mentioned that beverages produced in this manner must necessarily have a water base since carbon dioxide is introduced into the beverage only through the medium of water.

The invention provides an efficient apparatus for carbonating beverages immediately before the beverage is consumed. The apparatus is particularly well suited for the carbonating of a beverage consisting of several ingredients which are being mixed and carbonated at the same time. The invention provides an apparatus which causes the beverage at the time of pouring or consuming from the vessel or cup in which it was carbonated to contain the greatest amount of carbon dioxide which the liquid can possibly absorb. The carbon dioxide may be supplied from conventional steel cylinders to the apparatus which is adapted to hold a mixing cup in which the beverage is being mixed and carbonated within a few seconds.

The various objects, features and advantages of the invention will appear more fully from the detailed description which follows accompanied by drawings showing for the purpose of illustration an apparatus for carrying out the invention. The invention also consists in certain new and original features of construction and combination of parts hereinafter set forth and claimed.

Although the characteristic features of the invention which are believed to be novel will be particularly pointed out in the claims appended thereto, the invention itself its objects and advantages, and the manner in which it may be carried out may be better understood by referring to the following description taken in connection with the accompanying drawings forming a part of it, in which:

Fig. 1 is a side view, partly in section, of an automatic mixing and carbonating machine adapted to carry out the invention;

Fig. 2 is a sectional plan view, on an enlarged scale, of a detail of the machine shown in Fig. 1, a section being taken on line 2—2;

Fig. 3 is a sectional plan view, on an enlarged scale, of a detail of the machine shown in Fig. 1, a section being taken on line 3—3;

Fig. 4 is a sectional plan view, on an enlarged scale, of a detail of the machine shown in Fig.1, a section being taken on line 4—4; and Fig. 5 is a wiring diagram of the apparatus shown in Fig. 1.

In the following description and in the claims various details will be identified by specific names for convenience. The names however are intended to be as generic as their application as the art will permit. Like reference characters refer to like parts in the several figures of the drawings.

In the drawings accompanying, and forming part of, this specification certain specific disclosure of the invention is made for the purpose of explanation, of broader aspects of the invention, but it is understood that the details may be modified in various respects without departure from the principles of the invention, and that the invention may be applied to other structures than the one specifically shown.

Referring to the drawings the apparatus shown in Fig. 1 comprises a base 11 resting on resilient rubber feet 12. The base 11 carries a cylindrical bearing sleeve 13 in which the cylindrical stem 14 of a support 15 is vertically movable. A support 15 provides a seat 16 for a cup 17 which may easily be placed on the seat or removed therefrom by hand.

A gasket 18 mounted in the top portion of the support 15 at 19 bears resiliently against the rim 20 of the cup. The gasket 18 is substantially cup-shaped and rests with its rim portion 21 against an internal flange 22 of the support. The gasket 18 may be acted upon by fluid pressure admitted through a conduit 24 in the support, causing the gasket to expand and seat firmly against the rim 20 of the cup to form a fluid tight pressure chamber 25 with the cup, flow of pressure fluid into the chamber being delayed by a constriction 23 in the conduit 24.

The conduit 24 extends centrally through the stem 14 of support and communicates with a gas supply duct 26 in the base. The gas supply duct 26 is sealed against the wall of the conduit by a suitable gasket or packing 27 to provide a pressure tight connection between the supply duct 26 of the base and the conduit 24 of the support during movement of the support 15 relatively to the base 11.

The support 15 with the cup 17 therein may be vibrated vertically relatively to the base 11 by a motor 28 carrying an eccentric or crank 29 on its shaft 30. The crank 29 engages a connecting rod 31 pivotally connected to the support at 32. A counterweight 33 is provided on the crank 29 to provide proper balance of the moving mechanism.

The gas supply duct 26 is mounted in a boss 34 of the base 11 and has two branches 35 and 36. Branch 35 leads to a supply valve 37. The supply valve has a stem 38 and is acted upon by a spring 39 tending to open the valve to admit gas under pressure from a supply duct 40 coming from a source of carbon dioxide under pressure (not shown). The valve stem 38 is acted upon by a resilient actuating bar 41 mounted at 42 and engaged by a cam 43 on a shaft 44.

The branch duct 36 leads to a vent valve 45 adapted to establish communication between the branch duct 36 and a vent passage 46 leading to the atmosphere at 47. The valve 45 has a valve stem 48 and is acted upon by a spring 49 tending to maintain the vent valve open. The valve stem 48 is acted upon by an actuating bar 50 mounted at 51 and engaged by a cam 52 likewise mounted on the cam shaft 44.

The cam shaft 44 is driven by a timing motor 53 to a suitable reduction gearing 54. A joint control switch 55 is provided for both the agitator or shaker motor 28 and the timing motor 53. The switch 55 has an actuating stem 56 engaged by an actuating bar 57. The bar 57 is pivoted at 58 and acted upon by a spring 59 tending to maintain the bar 57 in engagement with a cam 60 and the post 61 of a push button 62. The cam 60 is also mounted on the cam shaft 44 driven by the timing motor 53.

The electrical connection of the motors and details of the switch are diagrammatically illustrated in Fig. 5. Terminals 63 may be connected to a suitable point of power supply (not shown). From one of the terminals 63 a lead 64 extends to both the timing motor 53 and to the vibrator motor 28. A lead 65 extends from the other terminal to a movable switch member 66 adapted to be brought into contact with a yieldable contact 67 and thereafter, after further depression of the switch member 66 with a further contact 68. Contact 67 is connected with the timing motor 53 through a lead 69 and contact 68 is connected with the vibrator motor 28 through a lead 70. The push button 62 is so arranged that upon depression it causes contact of the movable switch member 66 with the contact 67 only, whereby the timing motor is started. The timing motor then drives the cam shaft 44 on which the cam 60 is mounted and the cam 60 upon rotation depresses the movable switch member 66 further into contact with the fixed contact 68. This starts the vibrator or shaker motor 28. When the cam shaft 44 has nearly completed one revolution the cam 60 first opens the circuit of the shaker motor 28 and thereafter the circuit of the timing motor 53 whereafter the device comes to rest.

According to this invention a beverage is carbonated by enclosing it in a pressure tight chamber larger than the volume of the beverage. Carbon dioxide under pressure is admitted into the space of the chamber above the liquid and the chamber with the beverage therein is shaken violently to bring the liquid particles into intimate contact with the carbon dioxide gas, whereby the liquid becomes saturated with carbon dioxide. Preferably additional carbon dioxide gas is supplied during the shaking to replace the gas absorbed by the liquid. A few seconds are usually sufficient for complete carbonization. The beverage is then permitted to assume a quiescent state, the supply of carbon dioxide is shut off and the gas pressure in the pressure chamber is vented to the atmosphere whereafter the beverage is ready for consumption.

The apparatus shown in the drawings carries out just described method as follows: The cup 17 is partly filled with beverage and then placed on a seat 16 of the support 15. At this time the controls of the apparatus are in the positions shown in the drawings. More particularly the supply valve 37 is closed, the vent valve 45 is open and the switch 55 is likewise open, both motors 28 and 53 being at rest.

The cycle of operation is started by pressing the push button 62 which depresses the actuating bar 57 sufficiently to close the circuit for the timing motor through switch member 56 and contact 67. The timing motor begins to run turning the cam shaft 44. Cam 52 on the shaft 44 first closes the vent valve 45, thereafter cam 43 causes the supply valve 37 to open, whereby carbon dioxide gas under pressure is admitted into the cup 17. The pressure inside the cup causes the gasket 18 to expand sealing the interior 25 of the cup 17 against the atmosphere and clamping the cup firmly against the seat 16. Immediately thereafter the cam 60 depresses the bar 57 further causing the switch to close the circuit for the shaker motor 28 by contact of switch member 66 with contact point 68. The support 15 is now shaken violently and the contents of the cup 17 brought into intimate contact with the carbon dioxide gas in the chamber 25. Accidental splashing of liquid into the conduit 24 is prevented by a baffle 71 at the outlet of the conduit 24. Near the end of one revolution of the cam shaft 44 the cam 60 first causes the circuit for the shaker motor 28 to open whereby the support comes to rest. However, the circuit for the timing motor is still closed for a certain period of time during which, in succession, the cam 43 closes the supply valve 37, the cam 52 opens the vent valve and finally the cam 60 reaches the position in which also the circuit for the timing motor opens by disengagement of switch members 66 and 67. The device is now completely at rest and all control elements in the position shown in the drawings. Relief of pressure from the chamber 25 relieves the force of the gasket 18 on the rim of the cup 17, permitting removal of the cup from the device for consumption of the now fully carbonated beverage.

The invention thus provides a very efficient method of carbonating beverages and a relatively simple yet fully automatic apparatus for carrying out the method. Obviously the present invention is not limited to the particular form of apparatus herein shown and described but may be practiced by other devices. The invention may also be modified in various respects, various additions, omissions, substitutions and other changes be made without departing from the essence of the invention. All such changes will be apparent to persons skilled in the art and do not involve a departure from the spirit and the teachings of this invention.

What is claimed is:

1. Apparatus for carbonating beverages comprising, in combination, a base; a support movably mounted on said base; a hollow vessel adapted to be seated on said support; means for sealing said vessel relatively to said support to form a pressure tight chamber of said vessel; power means for vibrating said support relatively to said base; a conduit for supplying gas under pressure into said chamber; an admission valve in said conduit; a vent duct leading from said chamber to the atmosphere; a vent valve in said duct; a timing motor; a switch for said timing motor; cam means driven by said timing motor for actuating said power means, admission valve, vent valve, and switch; and manually operable means for operating said switch independenly of said cam means.

2. Apparatus for carbonating beverages comprising, in combination, a base; a support movably mounted on said base; a first motor on said base; eccentric drive means powered by said motor for vibrating said support relatively to said base; a cup adapted to be seated on said support; means for sealing said cup relatively to said support to form a pressure tight chamber; a conduit for supplying gas under pressure into said chamber; an admission valve in said conduit; a vent duct leading from said chamber to the atmosphere; a vent valve in said duct; a second motor; means driven by said second motor for operating in timed relationship said admission valve, said vent valve, and said first motor and for stopping said second motor; and manual means, separate from said motor driven means, for starting said second motor.

3. Apparatus for carbonating beverages comprising, in combination, a base; a support movably mounted on said base; a motor on said base; eccentric drive means powered by said motor for vibrating said support relatively to said base; a cup adapted to be seated on said support; means for sealing said cup relatively to said support to form a pressure tight chamber; a conduit for supplying gas under pressure into said chamber; an admission valve in said conduit; a vent duct leading from said chamber to the atmosphere; a vent valve in said duct; a timing motor; a switch for said timing motor; cam means driven by said timing motor for actuating said first named motor, admission valve, vent valve, and switch; and manually operable means for closing said switch independently of said cam means.

4. Apparatus for carbonating beverages comprising, in combination, a base; a support mounted on said base for vertical movement with regard thereto; a motor on said base; eccentric drive means actuated by said motor for imparting vertical vibrations to said support; a cup adapted to be seated on said support; a gasket adapted to bear against the rim of said cup for sealing said cup relatively to said support to form a pressure tight chamber, said gasket being acted upon by pressure in said cup to force it against said run; a conduit in said support leading to said chamber; a duct in said base communicating with said conduit; a source of carbon dioxide gas under pressure; an admission valve in said duct for admitting gas from said source; a vent passage in said base; a vent valve between said duct and said vent passage; a timing motor; a switch for said timing motor; cam means driven by said timing motor for actuating said first named motor, admission valve, vent valve, and switch; and manually operable means for closing said switch independently of said cam means.

5. Apparatus for carbonating beverages comprising, in combination, a cup; a closure for sealing the cup to form a pressure tight chamber, said closure including a cover portion adapted to fit over the opening of the cup, a bottom portion engaging the bottom of the cup, and a hollow inflatable gasket associated with the cover portion for sealing the cover portion to the rim of the cup, the gasket being adapted to be forced against the rim of the cup by inflation; a conduit associated with said closure for supplying gas under pressure to said chamber and to said gasket; an admission valve in said conduit; a constriction in said conduit for delaying the flow of gas into said cup with respect to the flow of gas into said hollow gasket; and venting means for establishing communication between said chamber and the atmosphere.

6. Apparatus for carbonating beverages comprising, in combination, a base; a support mounted on said base with freedom of reciprocating movement, said support being adapted to receive a cup-shaped vessel; sealing means on said support adapted to engage a cup-shaped vessel placed thereon to form a pressure tight chamber therewith; power means for reciprocating said support relatively to said base; a conduit in said support for supplying gas under pressure into said chamber; an admission valve in said conduit; a vent duct in said support leading from said chamber to the atmosphere; a vent valve in said duct; and means for actuating said admission valve, power means, a motor; means driven by said motor for operating in timed relationship said admission valve, said vent valve, said power means, and for stopping said motor; and manual means separate from said motor driven means for starting said motor.

7. Apparatus for carbonating beverages comprising, in combination, a base; a support mounted on said base with freedom for reciprocating movement, said support having a bottom portion adapted to support the bottom of a cup and a top portion including sealing means adapted to engage the rim of a cup to form a pressure tight chamber with the cup; power means for reciprocating said support relatively to said base; a conduit in said support for supplying gas under pressure into said chamber; an admission valve in said conduit; venting means for establishing communication between said chamber and the atmosphere; a motor; means driven by said motor for operating in timed relationship said admission valve, said power means, said vent valve and for stopping said motor; and manual means separate from said motor driven means for starting said motor.

PAUL KOLLSMAN.

(References on following page)

REFERENCES CITED

The following references are of record in the file of this patent:

UNITED STATES PATENTS

| Number | Name | Date |
|---|---|---|
| 1,336,720 | Baulig | Apr. 13, 1920 |
| 1,527,227 | Sanders | Feb. 24, 1925 |
| 1,591,971 | Garrett | July 13, 1926 |
| 1,711,900 | Moisant | May 7, 1929 |
| 1,885,678 | Boyer | Nov. 1, 1932 |
| 1,933,135 | Barthelmes | Oct. 21, 1933 |
| 2,201,322 | Schwartz | May 21, 1940 |

FOREIGN PATENTS

| Number | Country | Date |
|---|---|---|
| 233,743 | Great Britain | May 18, 1925 |